United States Patent
Vincent et al.

(10) Patent No.: US 9,916,707 B2
(45) Date of Patent: Mar. 13, 2018

(54) INTERACTING WITH EMBEDDED DEVICES WITHIN A USER'S ENVIRONMENT

(71) Applicant: ARM IP Limited, Cambridge (GB)

(72) Inventors: Hugo John Martin Vincent, Cambridge (GB); Krisztian Flautner, Cambridge (GB)

(73) Assignee: ARM IP Limited, Cambridge (GB)

( * ) Notice: Subject to any disclaimer, the term of this patent is extended or adjusted under 35 U.S.C. 154(b) by 31 days.

(21) Appl. No.: 13/987,648

(22) Filed: Aug. 19, 2013

(65) Prior Publication Data
US 2015/0048926 A1   Feb. 19, 2015

(51) Int. Cl.
| G05B 1/01 | (2006.01) |
| G07C 9/00 | (2006.01) |
| H01Q 1/27 | (2006.01) |
| G04G 21/04 | (2013.01) |

(52) U.S. Cl.
CPC ......... *G07C 9/00111* (2013.01); *H01Q 1/273* (2013.01); *G04G 21/04* (2013.01)

(58) Field of Classification Search
CPC .......... G05B 19/00; H04B 1/00; H04B 1/401; B60R 25/045; B60R 25/24; B60R 25/00; G07C 9/00309; G07C 9/00007; G07C 9/00182; E05B 19/22
USPC ....... 340/5.61, 5.63, 425.5, 5.73, 5.72, 5.25, 340/901; 455/41.2
See application file for complete search history.

(56) References Cited

U.S. PATENT DOCUMENTS

| 5,581,594 | A | 12/1996 | McAfee |
| 6,104,913 | A | 8/2000 | McAllister |
| 6,624,758 | B1 * | 9/2003 | Omata ............... G07C 9/00309 180/287 |
| 6,771,161 | B1 | 8/2004 | Doi et al. |
| 8,244,181 | B2 | 8/2012 | Shuo |
| 8,260,262 | B2 | 9/2012 | Ben Ayed |
| 8,294,569 | B2 | 10/2012 | Thorn et al. |
| 8,330,596 | B2 | 12/2012 | Tanaka et al. |
| 8,706,588 | B1 | 4/2014 | Zhu |

(Continued)

FOREIGN PATENT DOCUMENTS

| CN | 101491067 A | 7/2009 |
| CN | 102923092 A | 2/2013 |

(Continued)

OTHER PUBLICATIONS

International Search Report and Written Opinion of the International Searching Authority dated Sep. 30, 2014 in PCT/GB2014/052536, 8 pages.

(Continued)

*Primary Examiner* — George Bugg
*Assistant Examiner* — Munear Akki
(74) *Attorney, Agent, or Firm* — Nixon & Vanderhye P.C.

(57) ABSTRACT

An envoy device configured to perform a transaction with a further device. The envoy device comprises: a data store; a processor; communication circuitry for communicating with the further device; and a display. The envoy device is configured to respond to detection of the further device being within a predetermined physical proximity to trigger initiation of a transaction between the devices; and to respond to the transaction completing to display an object related to the transaction that it is determined the user may wish to select to initiate a subsequent action.

23 Claims, 12 Drawing Sheets

(56) References Cited

U.S. PATENT DOCUMENTS

| | | |
|---|---|---|
| 9,088,895 B2 | 7/2015 | Vincent et al. |
| 2002/0109580 A1* | 8/2002 | Shreve .............. G07C 9/00103 340/5.61 |
| 2003/0117261 A1* | 6/2003 | Gunsch ............. G07C 9/00182 340/5.25 |
| 2003/0151982 A1 | 8/2003 | Brewer et al. |
| 2004/0080403 A1* | 4/2004 | Eshel ................ G07C 9/00944 340/425.5 |
| 2006/0128305 A1 | 6/2006 | Delalat |
| 2006/0246957 A1* | 11/2006 | Lim .................. H04M 1/72552 455/566 |
| 2007/0085759 A1* | 4/2007 | Lee ...................... G06F 1/1616 345/1.1 |
| 2008/0068162 A1* | 3/2008 | Sharma ............... G08B 25/008 340/545.1 |
| 2008/0299907 A1 | 12/2008 | Takayama |
| 2009/0195350 A1 | 8/2009 | Tsern et al. |
| 2009/0282130 A1 | 11/2009 | Antoniou et al. |
| 2010/0176919 A1* | 7/2010 | Myers ................ G07C 9/00571 340/5.73 |
| 2010/0264209 A1 | 10/2010 | Tessier |
| 2010/0304670 A1 | 12/2010 | Shuo |
| 2012/0274508 A1* | 11/2012 | Brown .................... G04F 10/00 342/357.25 |
| 2012/0280790 A1* | 11/2012 | Gerhardt ............ G07C 9/00309 340/5.61 |
| 2012/0309309 A1 | 12/2012 | Cho et al. |
| 2012/0310717 A1 | 12/2012 | Kankainen |
| 2013/0052946 A1* | 2/2013 | Chatterjee ............. H04W 4/008 455/41.1 |
| 2013/0124630 A1 | 5/2013 | Reunamaki et al. |
| 2013/0182382 A1 | 7/2013 | Vardi et al. |
| 2013/0250734 A1* | 9/2013 | Narasani ................ G04G 13/02 368/9 |
| 2014/0045547 A1 | 2/2014 | Singamsetty et al. |
| 2014/0076969 A1* | 3/2014 | Marshall Chesney ............ G07C 9/00103 235/382 |
| 2014/0087685 A1* | 3/2014 | Kellond .................. G06F 3/041 455/404.2 |
| 2014/0210592 A1* | 7/2014 | Van Wiemeersch ..... G05B 1/01 340/5.61 |
| 2014/0273856 A1* | 9/2014 | Kyles .................... H04B 1/401 455/41.2 |
| 2014/0285319 A1* | 9/2014 | Khan ................. G07C 9/00309 340/5.61 |

FOREIGN PATENT DOCUMENTS

| | | |
|---|---|---|
| CN | 102984346 A | 3/2013 |
| CN | 202966232 U | 6/2013 |
| EP | 1 906 294 | 4/2008 |
| EP | 2 557 764 | 2/2013 |
| EP | 2 335 439 | 4/2013 |
| WO | WO 2010/030415 | 3/2010 |
| WO | WO 2013/021094 | 2/2013 |
| WO | 2013/072435 | 5/2013 |

OTHER PUBLICATIONS

Antoniou, Z. et al., "Intuitive mobile user interaction in smart spaces via NFC-enhanced devices", IEEE Computer Society, (2007), 6 pages.

Pulipati, M. et al., "Comparison of Various Short Range Wireless Communication Technologies with NFC", International Journal of Science and Research, vol. 2, Issue 4, (Apr. 2013), pp. 87-91.

International Search Report and Written Opinion of the International Searching Authority dated Nov. 6, 2014 in PCT/GB2014/052537, 12 pages.

Chinese First Office Action dated Jun. 1, 2017 in CN 201480042353.6 and English translation, 19 pages.

* cited by examiner

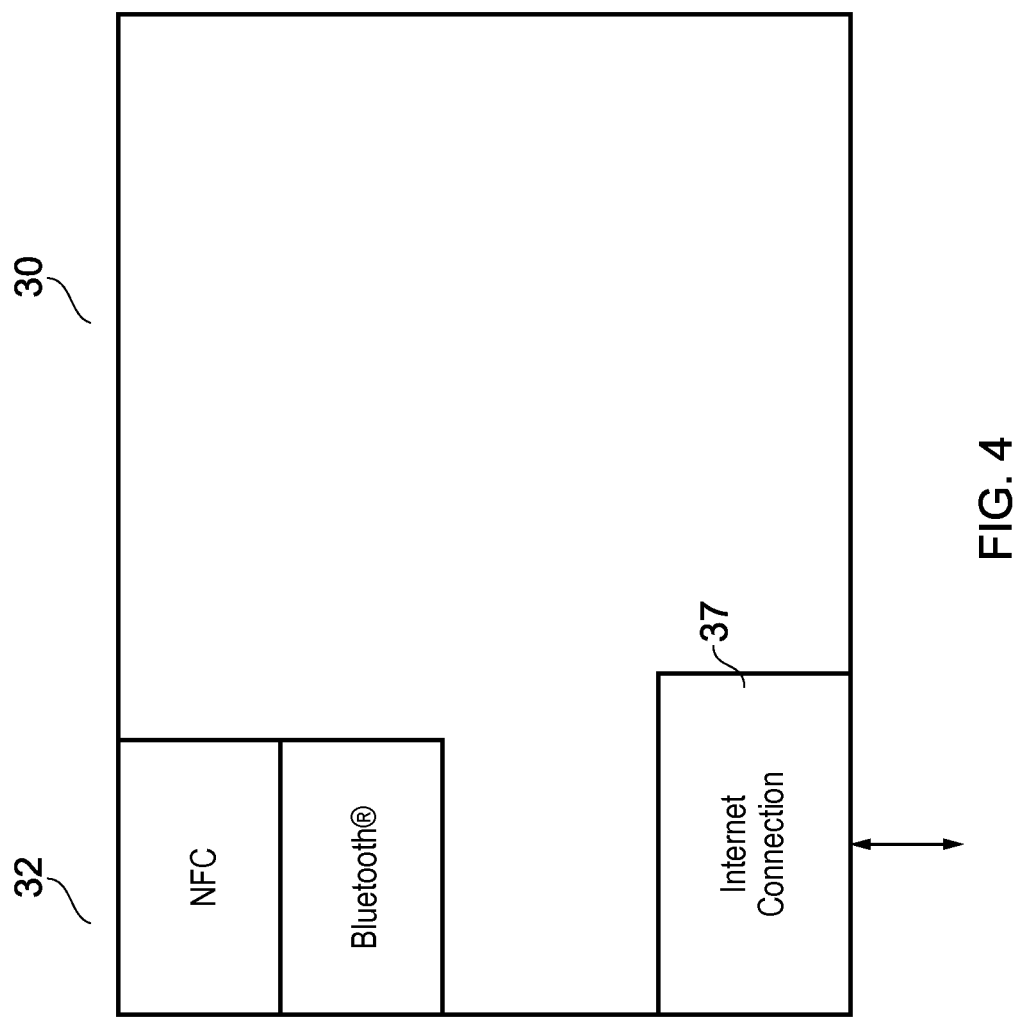

INTERACTING WITH EMBEDDED DEVICES WITHIN A USER'S ENVIRONMENT

TECHNICAL FIELD

The technical field relates to data processing devices and in particular to devices that can interact with other local devices.

BACKGROUND

There are an increasing number of embedded devices in a user's environment and increasing opportunities to provide further embedded devices, however interacting with different devices where there are different protocols and different ways of accessing the devices can be complicated for a user and may discourage them from using such devices.

It would be desirable to provide a device that allowed a user to interact with other local devices found within an environment in a manner which simplified the user's experience and conserved their attention while maintaining security.

SUMMARY

A first aspect provides an envoy device configured to perform a transaction with a further device, said envoy device comprising:
a data store;
a processor;
communication circuitry for communicating with said further device; and
a display;
said envoy device being configured to respond to detection of said further device being within a predetermined physical proximity to trigger initiation of a transaction between said devices; and
in response to said transaction completing to display an object related to said transaction that it is determined said user may wish to select to initiate a subsequent action.

Providing a device that will automatically trigger a transaction in response to the device being close to another device with which it can communicate is a straightforward and secure way of allowing a user to interact with devices in his environment. Furthermore, providing the user with a displayed object that it is considered likely that they may wish to select to initiate a subsequent transaction once the previous transaction has completed provides the user with a simple way of initiating further transaction and avoids the need for a user to pursue complex menus to do so. Furthermore, allowing the transaction to complete without requiring additional input from the user improves the ease of use and the user experience. In effect a transaction is triggered and completes automatically simply by proximity of devices.

It should be noted that the device being within a predetermined physical proximity, of the further device occurs when the envoy device is within communication range of the further device. This may occur by connecting to the further device or by a user touching the further device, or by being within communication range of certain communication circuitry, for example near field communication circuitry within both devices.

The display of the at least one further option for a subsequent transaction means that the further option(s) is easily available via this automatic display. The option(s) displayed is the option that it is considered the user would be most likely to select following the previous transaction.

It should be noted that an envoy device is any processing device with communication capability. Generally it is a portable device that can be conveniently carried or worn by a user, for example a watch, or a key fob or some piece of jewelry.

In some embodiments, said envoy device is configured to respond to detection of said further device being within a predetermined physical proximity and at least one further condition to trigger initiation of a transaction between said devices.

In some cases a further condition in addition to the physical proximity may be required to trigger initiation of the transaction. This further condition may include the envoy device having of a permission relating to the further device stored on it or the envoy device having a pending intent to perform a transaction with the further device. A pending intent is a transaction that is waiting to be performed or be completed with said further device. When a communication is made between the two devices recognition of these further conditions being met can be determined and the relevant transaction can be initiated.

In some embodiments, said envoy device is configured to display a plurality of related objects in response to a user operation.

Although the envoy device automatically displays an object relating to the transaction that it is determined the user may wish to select on completion of the transaction it may be that this is not the object that the user is interested in but another related object which may be the object that he requires. Thus, in some embodiments a simple user operation will bring up a display of a plurality of related objects. This user operation may for example be scrolling on the originally related objects such that a list of other related objects appears one after the other on the display.

In some embodiments, said envoy device is a portable device, and said display is configured to display fewer than 10 lines of text or 10 icons.

The ability to automatically display a related object on completion of the transaction is particularly useful where the envoy device is a portable device and the display is therefore necessarily small, such that retrieval of relevant information may not be easy. For example, this display may be of a size such that it can display fewer than ten lines of text or ten icons or in some cases it may only be able to display fewer than five lines of text and in others it may just display a single line of text or a single icon.

In some embodiments, said envoy device is configured to display said related object for a predetermined time after completion of said transaction and then to revert to one of a default display and a previously shown display.

Although the related object may be an object that the user wishes to select following that transaction, in many cases the user may not wish to perform a subsequent transaction and for this reason, in some cases the envoy devices configured to revert to a default display a predetermined time after completion of the transaction. In other embodiments it may revert not to a default display but to the display that it was displaying prior to the transaction occurring. This may be useful if the user was in the process of using the envoy device for a different purpose to the transaction that was triggered by the proximity of the further device. If this is the case the user may well wish to return to the previous display.

Although the envoy device may take a number of forms, in some cases it is configured to be worn by the user.

A convenient way of carrying a device is to wear. Furthermore, where the device is a secure device particular to that user, wearing the device is a secure and convenient way of ensuring that one has the device with one when required.

Although the envoy device can take a number of forms in some cases the envoy devices are watches and display a time as said default display. In this regard, the time may just be the time of the day or it may include the date.

In some embodiments, said envoy device is configured to detect said predetermined physical proximity of said further device in response to said user touching said further device.

Although the predetermined suitable proximity to the further device can be detected in a number of ways, in some cases it is detected in response of the user touching a further device.

Where the envoy device is worn then a signal sent through the body is a convenient way of detecting the further device, and as in many cases the user will be touching the further device, this provides a way of initiating the communication link in cases where the intent of the user is clear.

In some embodiments, said transaction comprises use of a permission stored within said envoy device, said displayed related object relating to said permission.

Although the transaction can comprise a number of things in some cases they comprise a user permission that is stored in the envoy device and in which case the displayed related object relates to that permission. Envoy devices may be used to securely store and carry permissions such as keys to various locations.

In some embodiments, said envoy device comprises a clock, said envoy device being configured to process permissions having a valid lifetime and to determine when said permissions with said valid lifetime have expired in dependence upon a value of said clock.

In some cases permissions may be time dependent and may expire. It is convenient if the envoy device has a clock such that it can determine when the permissions have expired and ensure that they are made invalid.

Although the permissions can take a number of forms, in some embodiments said permission comprises at least one of a travel ticket, a key configured to provide access to a location, access to a thermostat, access to control of a power outlet and a representation of money.

Any sort of permission that allows access to a processing device or access to a service controlled by such a device can be stored on the envoy device and used to gain such access in a straightforward, secure and user friendly manner.

In some embodiments, said permission comprises a key and said further device comprises a lock, said displayed related object comprising a set of keys stored within said device, said set of keys comprising said key and further keys related to said key and having different access permissions.

A particular convenient use of the envoy device is as a key to unlock a lock. In which case the related object that is displayed may comprise a set of keys that are stored within the device including the keys to unlock the lock and further keys that are related to that key but have different access permissions. When accessing a room or a building it may be that you wish to leave that lock unlocked for a while to allow other people to enter, or you may wish to send the key to that lock to a friend. Thus, displaying related keys on the display of the envoy device allows easy access to these keys by the user in a straightforward and convenient manner such that he can perform such a subsequent task if desired.

In some embodiments, at least one of said key and said further keys is a control key said control key being configured to perform at least one of:

open said lock and to keep said lock open for a predetermined length of time, and open and access diagnostic features in a car.

One of the keys that can be accessed via the display following completion of the transaction may be a control key which has particular functions such as leaving a lock open for a predetermined length of time or allowing access to a particular thing such as diagnostic features in a car where the key is the maintenance key.

In some embodiments, said envoy device is configured to display a list of said most recently displayed related objects in response to a user selection.

Although, it is envisaged that the user may wish to select the displayed related object following completion of the transaction within a predetermined time, it may be that the user does not at this point wish to access that related object but later may determine that one of the previous uses of the envoy device was relevant to what the user wishes to do now. In such a case, it is convenient if the user can access a list of the most recently displayed related objects following completion of the most recently performed transactions such that the relevant one can be selected and used in a simple and straightforward manner.

As noted previously, detecting the predetermined physical proximity may be done in a number of ways. For example, where the envoy device is worn it may be detected by the user touching the further device. Alternatively, where the communication circuitry is a near field communicator then it may be detected by establishing near field communication between the envoy device and the further device.

In other embodiments, it may be determined when the envoy device is bought within a predetermined distance of said further device, for example within 5 cm of the further device.

In some embodiments, said envoy device is configured to detect said predetermined physical proximity with said further device in response to detecting said envoy device being moved in a predetermined pattern within a predetermined distance of said further device.

The detection of a predetermined pattern of movement of the envoy device although perhaps more complex than determining physical proximity, is less likely to be detected by accident in that a particular pattern of movement is unlikely to occur unless the user intends that pattern of movement to be performed and performs it deliberately. In this way, such an envoy device will only react with a further device in response to a user's intention and as such, the actual physical proximity between the two devices may be sufficient to automatically trigger the initiation of the transaction without requiring any other further conditions.

Although the predetermined pattern may take a number of forms, in some embodiments said predetermined pattern comprises said envoy device moving towards and then away from said further device within a predetermined period of time, while in other embodiments said predetermined pattern comprises said envoy device being moved to a particular orientation.

The predetermined pattern may be the pattern of the user "bumping" the envoy device against the further device or it may be in the case that the envoy device is worn, for example, that the envoy device is moved to a particular orientation that it is unlikely that the user would place the device in accidentally. Thus, in the case of a watch it may be moved to a horizontal orientation when it is close to the further device.

In some cases the envoy device may be connected to the further device by a physical link such as being plugged in to it using a cable and this may be the manner in which the predetermined physical proximity is detected.

A second aspect of the present invention provides a set of devices comprising said envoy device according to a first aspect of the present invention and said further device, said further device comprising at least one device located or embedded in the users environment.

A third aspect of the present invention provides a method of performing transactions between two devices located physically close to each other comprising the steps of:

detecting two devices within a predetermined physical proximity of each other;

triggering initiation of a transaction between said two devices in response to detecting said predetermined physical proximity;

in response to detecting said transaction completing displaying an object related to said transaction, that it is determined said user may wish to select to initiate a subsequent action on one of said devices.

A fourth aspect of the present of the present invention provides an envoy means for performing a transaction with a further device, said envoy means comprising:

a data storing means;

a processing means;

communication means for communicating with said further means; and a displaying means;

said envoy means being for responding to detection of said further means being within a predetermined physical proximity to trigger initiation of a transaction between said envoy means and said further means; and in response to said transaction completing displaying an object related to said transaction that it is determined said user may wish to select to initiate a subsequent action.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 schematically shows a further device having access to the internet;

FIG. 5b shows the display screen on the envoy device of FIG. 5a;

DESCRIPTION OF THE EXAMPLE NON-LIMITING EMBODIMENTS

Figure 1:
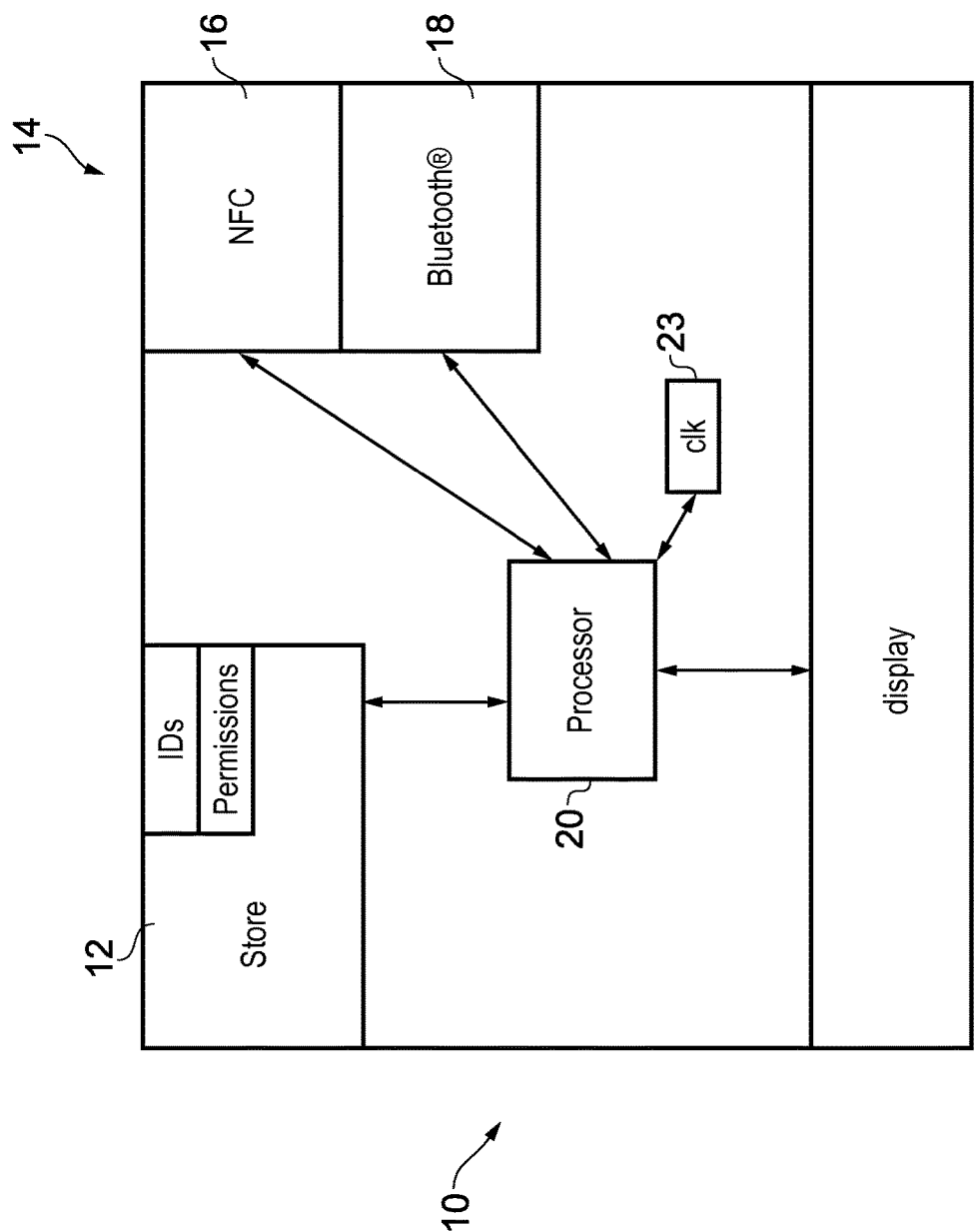
FIG. 1 schematically shows an envoy device according to an embodiment of the present invention.

FIG. 1 shows an envoy device 10 according to an embodiment of the present invention. Envoy device 10 has a data store 12 which stores data including permissions such as keys to locks, passwords to computing devices and information data regarding the owner of the device. There is also communication circuitry 14 including a near field communicating device 16 and a Bluetooth communicating device 18. A processor 20 controls these devices and also communicates with the display 22 for displaying information to the user.

This envoy device 10 is a portable device that is carried by the user and is used to interact with other devices that are found within the user's environment. These may be embedded devices located within various objects such as locks within doors, locks within cars including ignition locks or access barriers to train stations. They may also be other devices that can be controlled such as light switches, power outlets, computing devise that require a login ID or thermostats in heating devices. The envoy device 10 is configured to be able to communicate with these devices and to perform transactions with them such that they are controlled by the user in a straightforward manner using the envoy device. Furthermore, where security is an issue the secure permissions may be stored within the envoy device and transmitted automatically to the further device such that the appropriate access is granted to the user without the need for the user to memorise any passwords.

FIG. 1 also shows clock 23 that provides an indication of a current time. In some embodiments the envoy device is a watch and thus it needs to display the current time. The time may also be used by processor 20 to determine the validity of certain permissions stored within data store 12. In this regard, some of the permissions may have a lifetime associated with them such that they expire at a certain time. Having a clock 23 within the envoy device enables these permissions to be managed such that when they expire they can be deleted or marked as currently invalid. This allows permissions to be granted to such devices with a limited lifetime, for example permission to access a particular building having a lifetime of 12 hours may be granted to someone. This may be useful as a key to a hotel room for example. Clock 23 is a reliable clock which communicates with a radio clock intermittently to update its time.

Figure 2:
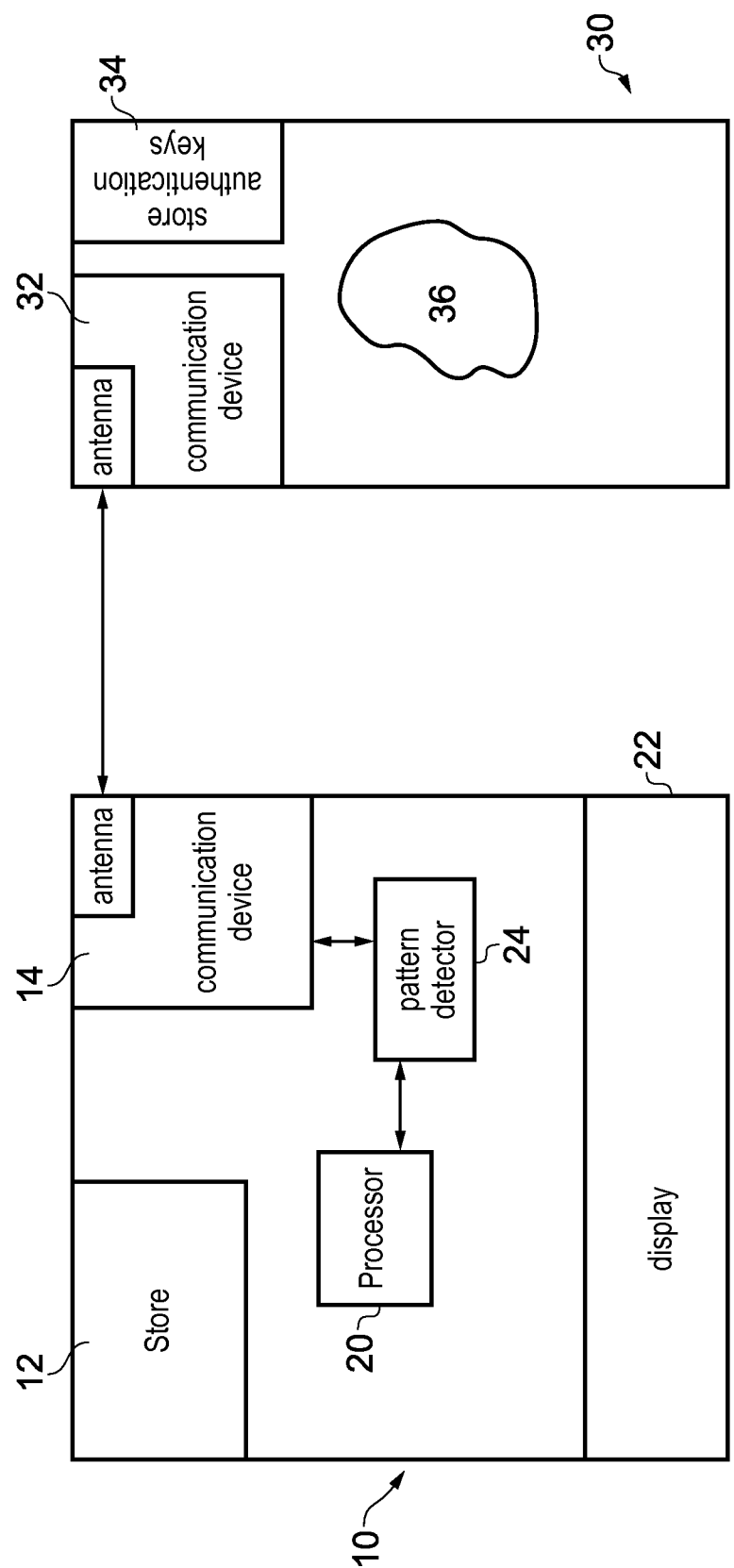
FIG. 2 schematically shows an envoy device and a further device according to an embodiment of the present invention.

FIG. 2 shows envoy device 10 communicating with a further device 30. Envoy device 10 is similar to the envoy device shown in FIG. 1 but further has a pattern detector 24 for detecting a pattern of movement of the envoy device with respect to the further device 30. In this regard, in some cases the envoy device is configured to automatically initiate a transaction with the further device simply when it is detected to be within a predetermined distance of that further device. In other cases the requirement to initiate the transaction may be that it is within a predetermined distance and it performs a predetermined pattern of movement. The pattern detector 24 is for detecting that pattern of movement.

In this regard, it may be advantageous if transactions are only initiated with the intent of the user such that it is not sufficient for the envoy device simply to pass within a predetermined distance of the further device but a particular pattern of movement must also be detected which indicates the intent of the user to interact with the device. The type of movement is selected not to be the sort of movement that might happen accidentally. In this way, the transaction can be deliberately started by the user in a simple straightforward manner. A pattern of movement may be simply moving the device towards the further device and away again in what is termed a "bump" movement.

FIG. 2 also shows further device 30 that also has communication circuitry 32 and a data store 34 for storing various information and for storing authentication keys for the communication circuitry. It also has further circuitry 36, that may be an actuator be for actuating a locking device for example or it may have some switching device for turning on or off a heater, a power outlet, a light switch or some other such controllable device.

Figure 3:
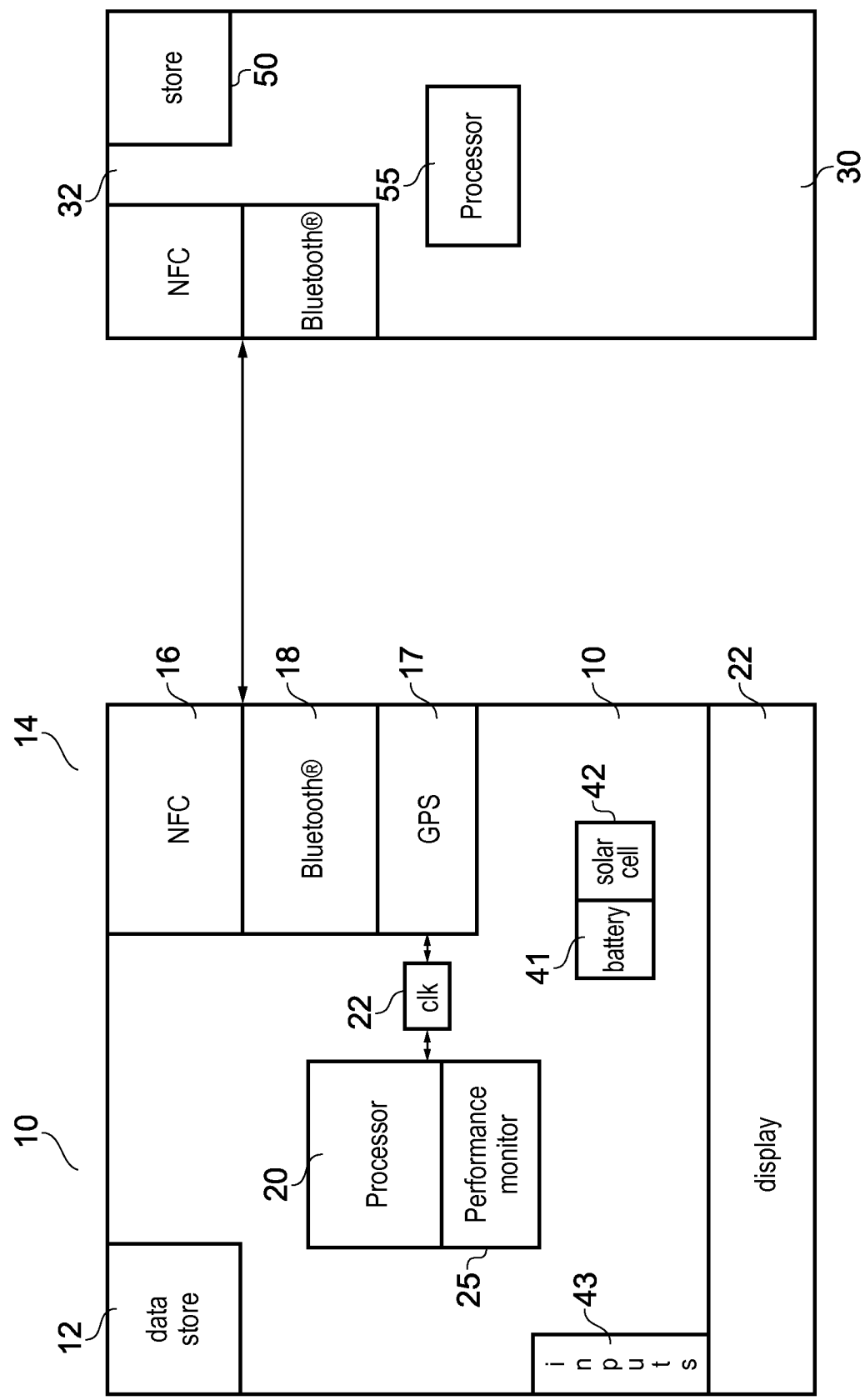
FIG. 3 schematically shows an envoy device and a further device according to a further embodiment of the present invention.

FIG. 3 shows a further example of an envoy device 10 and further device 30 according to an embodiment of the present invention. Envoy device 10 has a processor 20 for controlling the operations of the envoy device, a performance monitor 25 which monitors the operating conditions of the envoy device and determines the battery 41 capacity and the current operating states of the communication devices 16 and 17. The device also has data store 12 for storing data such as access keys for communication links and various permissions such as keys to locking devices and travel tickets that the envoy device provides access to.

There is also a display 22 of limited size for displaying in this case a single icon or a few lines of text. There is a battery 41 which is an extremely long life battery and which is supplemented by solar cells 42. There is also a user input device 43 for receiving user inputs. In this regard, the user may select an item on the display or may scroll through the display such that a list of selectable items are shown one after the other.

There is also a clock device 23 which receives signals from a GPS device 17 within communication circuitry 14. These signals are used to update the clock periodically to ensure that it has the correct time. This is important as the clock is used to determine when some of the permissions stored in data store 12 expire.

Envoy device 10 is configured to communicate with further device 30 when it is placed in close physical proximity to it. The further device 30 has communicating circuitry 32 including a near field communicating device and a Bluetooth® communicating device. There is also a data store 50 and a processor 55.

When envoy device 10 is placed in close physical proximity to further device 30 then a near field communication link is set up between the two devices and they exchange information with each other proactively regarding what other communication links they have access to and any access keys to these communication links. Thus, in this case they will both transmit to the other one that they have a Bluetooth communication link and they will transmit the keys that are required to access each other via that link. A transaction request will then be transmitted from envoy device 10 to the further device 30 across the near field communication link and this transaction will be initiated.

Now it may be that this transaction takes some time to complete and that during this time the user moves out of range of the near field communication link such that the transaction cannot complete across this link. In such a case, processor 20 will look at the received information and determine that there is a Bluetooth® link available to which it has the access key. It will then transmit a signal requesting access to that Bluetooth® communication link and the link will be made between the two devices as they both carry each other's authentication keys. The transaction can then complete across the Bluetooth® link without the user having to move back into close proximity to the further device.

In other embodiments, rather than the transaction automatically starting using the near field communication link it may be that the processor 20 controls which link to use using information from the performance monitor 25. In this regard, the performance monitor 25 will monitor current operating conditions of envoy device 10 and depending on the transaction will select the appropriate link for the transaction to be performed via. Thus, it may be that it determines that the Bluetooth® communication circuitry is already active and communicating with a device. In this case, it may not require much additional energy to use this Bluetooth® communication link to communicate with the further device and this may in fact be more energy efficient that continuing to keep the near field communication channel active. Thus, it may decide to perform the transaction using the Bluetooth® link. In other cases, it may determine that the Bluetooth® communication circuitry is not active and it will be more energy efficient to maintain the near field communication link where possible and to complete the transaction using this.

In some cases, the further device communicated with may not have a Bluetooth link and thus, it may be that the near field communication link is the only link that can be used and when the envoy device and further device are no longer connected due to the envoy device moving out of range of the near field communication link then a signal will be sent to the user via the display 22 that the transaction cannot be completed and that the user should move back into proximity with the further device such that it can complete the transaction.

FIG. 4 shows an alternative embodiment where further device 30 has an internet connection 37. In this embodiment when the initial link is set up between the devices using the near field communication link and details of the various communication links are passed between the two devices the further device 30 also advertises its capabilities to the envoy device 10 and in this case it advertises that it has a link to the internet by internet link 37. The envoy device can then store this information in its data store and if it has pending intents to access the internet it can connect to the internet via the further device and can complete these intents. It can also display to the user that the internet is available if the user wishes to input a new intent. In this regard, intents are transactions that the user has indicated he wishes to perform but which have not yet been performed due to lack of availability of resources to perform these transactions or which have not yet completed. These are stored within the device as pending intents and on forming a communication link with a further device it is determined whether the further device can process these intents and where it can the transactions are initiated.

Figure 5A:
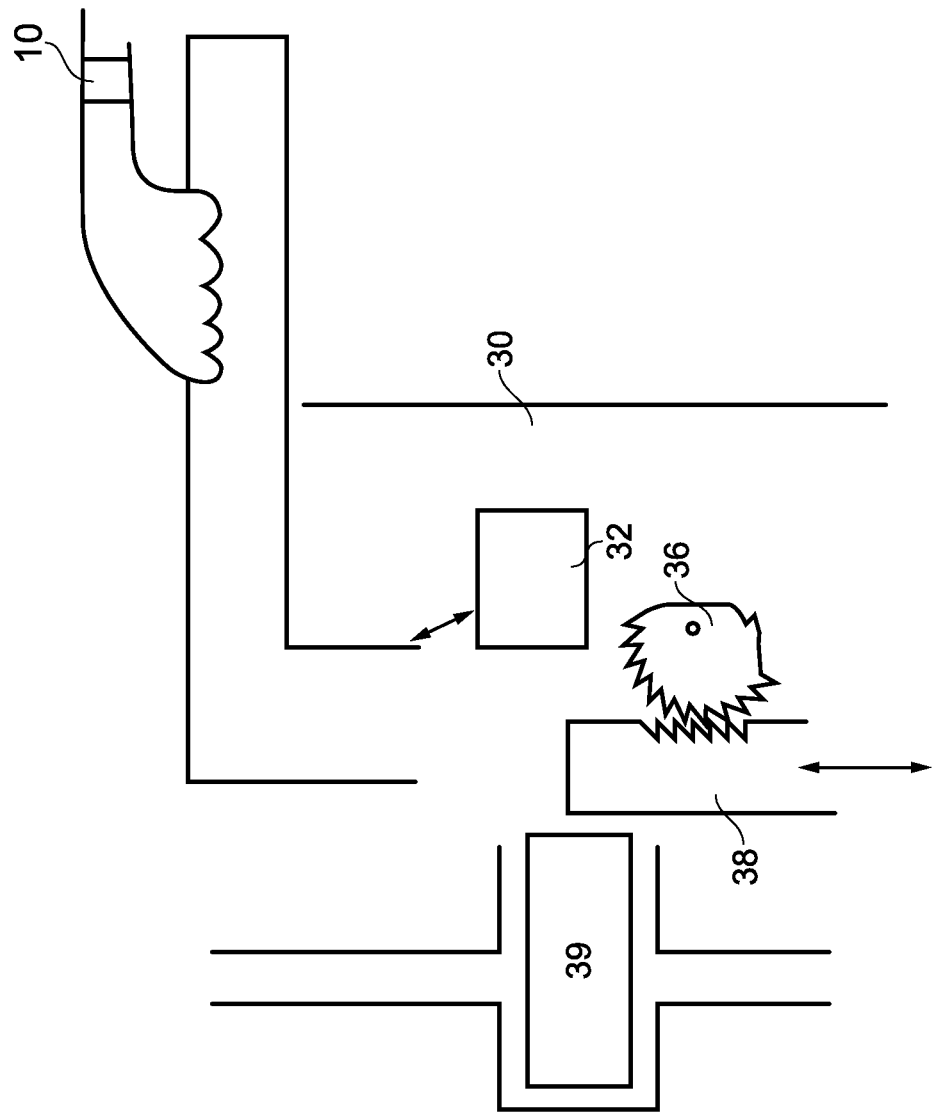
FIG. 5a schematically shows the opening of a lock by a person wearing an envoy device according to an embodiment of the present invention.

FIG. 5a shows an example of the envoy device being worn by a user as a watch device. In this case the further device 30 is located within a door locking mechanism and the touching of the door handle by the user when wearing the envoy device 10 indicates that the envoy device is within the predetermined physical proximity of the further device and triggers initiation of a transaction. In this regard, the envoy device 10 detects the touching by the user of the door handle 40 when signals from the envoy device 10 pass through the body of the user to the communicating device 32 of the further device and are received and a response is sent from the communicating device 32.

The envoy device 10 and further device 32 exchange information and in particular, the envoy device 10 transmits a permission to the further device 30 indicating that it has a stored key to that particular locking device and in response to receiving this the actuating device 36 within the locking mechanism drives the blocking bar 38 such that the locking mechanism 39 is released. In this way, the touching by the user of the handle 40 when wearing the envoy device 10 as a watch is sufficient to free the lock and allow access to the room. Although, in this embodiment the watch is shown as being on the hand that touches the door handle it is sufficient that the user is wearing the device on any part of the body when one part of the body touches the door handle.

Once the lock has been released the display 22 on the envoy device 10 displays a "coda" showing a set of keys related to this locking device. This is shown for 15 seconds after use of the lock and enables the user to select this set of keys and perform actions with them in a straightforward manner.

Figure 5B:
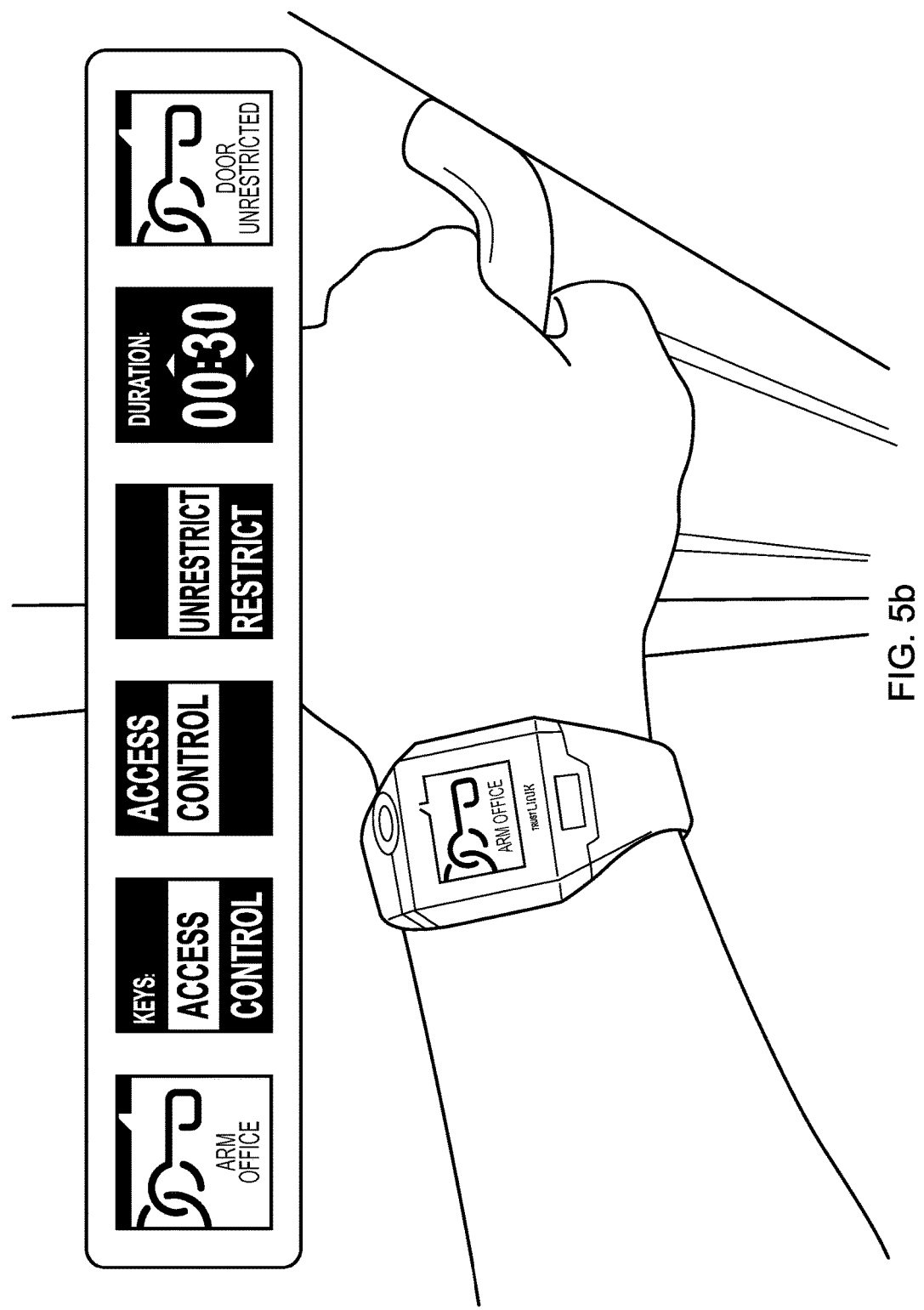

FIG. 5b shows examples of the "codas" displayed by the watch following the user touching the door and the access transaction completing. These illustrate the various selections that it is considered the user is likely to require.

Thus, following completion of the transaction a coda illustrating a set of keys is displayed and the user can select the displayed coda which relates to the set of keys and a display illustrating access and control is then provided so that he can then select either access which brings up the access key which he may want perhaps to select send to his friend or control which brings up a display of a control key which has further different permissions. Thus, he may select a control key that would allow the door to remain unlocked for perhaps the next 30 minutes.

If he had selected an access key to send to a friend then this would sit as a pending intent on his envoy device until the envoy device was able to connect with the internet whereupon the key would be sent via the cloud to his friend and the transaction would complete.

Figure 5C:
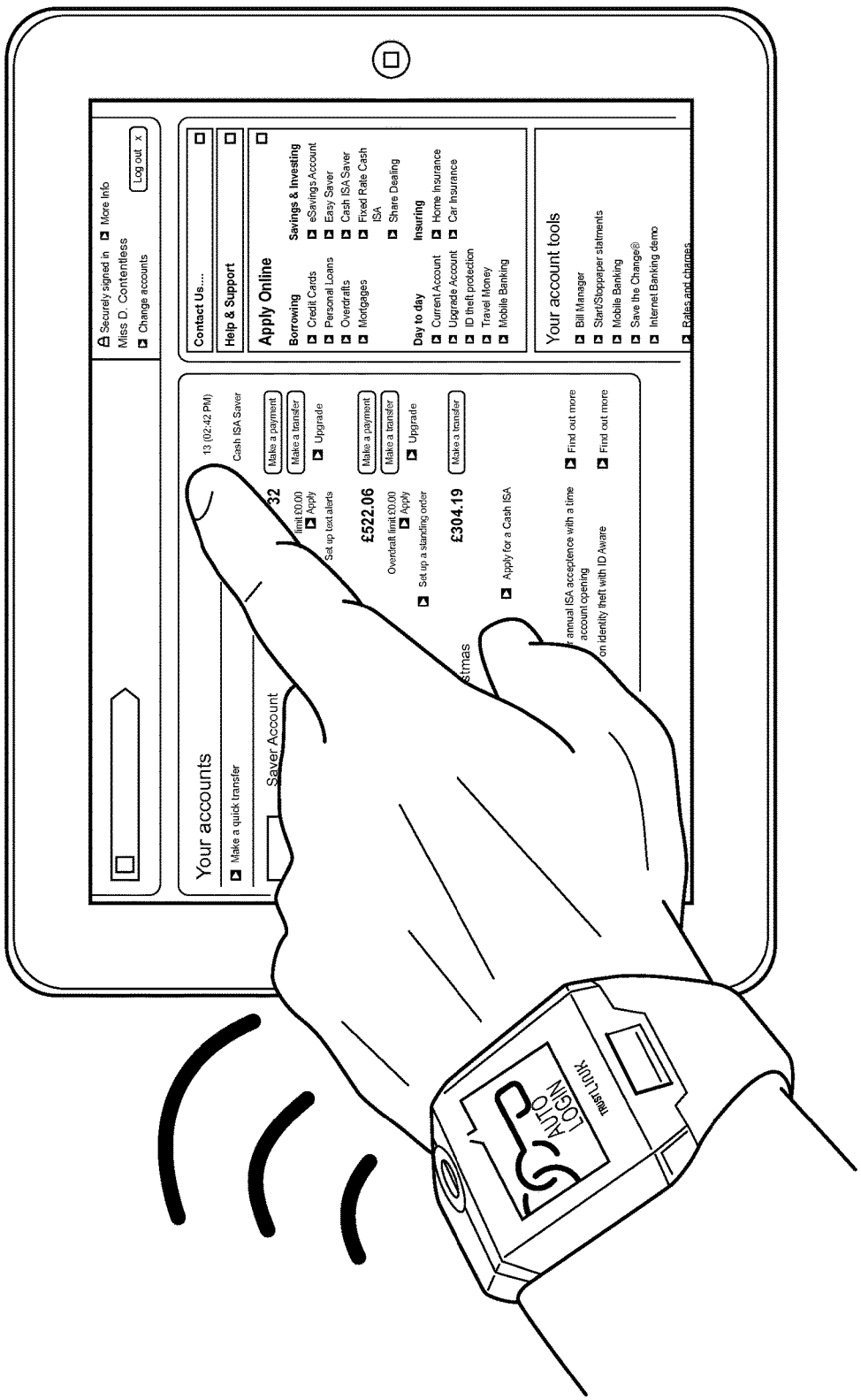
FIG. 5c shows an envoy device worn by a user providing an automatic login to a notebook.

FIG. 5C shows a further example of an envoy device being worn by a user. In this case the further device is a notepad device, and the envoy device has permissions stored within it for logging on to the notepad device and also for accessing various secure sites accessible via the notepad device. Thus, on detecting the notepad device in proximity to it, the envoy device will initiate communication via a near field communication link and the devices will proactively transfer details of any other communication links that they have access to. The envoy device will detect that it has permissions stored relating to the notepad device and will initiate a log on to that notepad device. In this way simply by placing the envoy device close to the notepad the user will automatically be logged on to this. The envoy device may then display automatic log on transactions to various sites accessible via the notepad that the user can select if he wishes to access these sites. Again as all the login information is stored within the envoy device the login can be performed automatically without the need for the user to remember the passwords or indeed perform any further actions.

Figure 6:
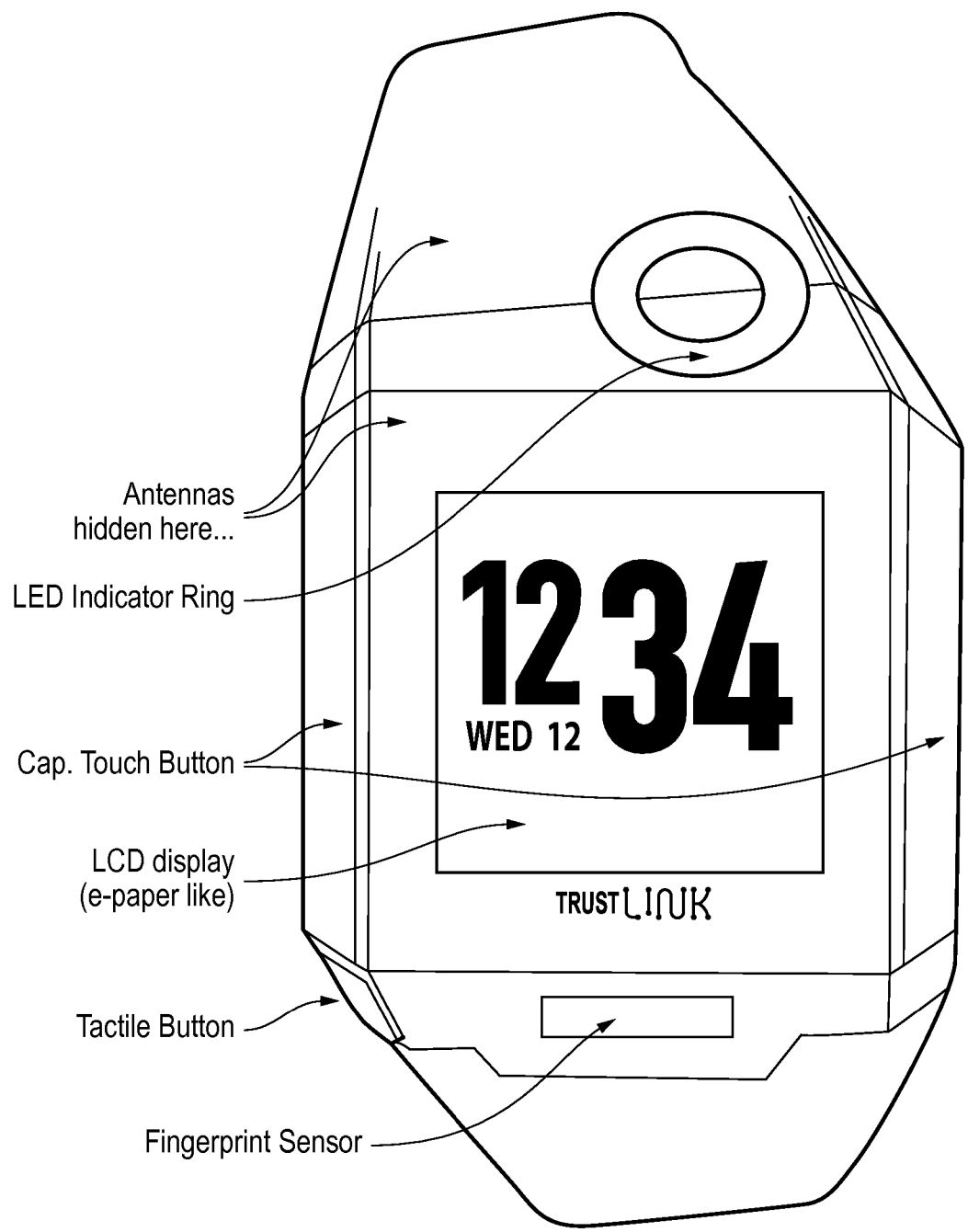
FIG. 6 shows a schematic representation of the display and other features of an envoy device according to an embodiment of the present invention.

FIG. 6 shows an envoy device 10 in the form of a watch having a display that displays the time and date. A fingerprint detector is provided for security reasons such that a user can be securely identified, antenna placements where the antennas are hidden to transmit both near field and some other communication perhaps Bluetooth® or Wi-Fi® from an LED indicator room and some different buttons and sliders for use by the user who may wish to scroll between different displays.

Figure 7:
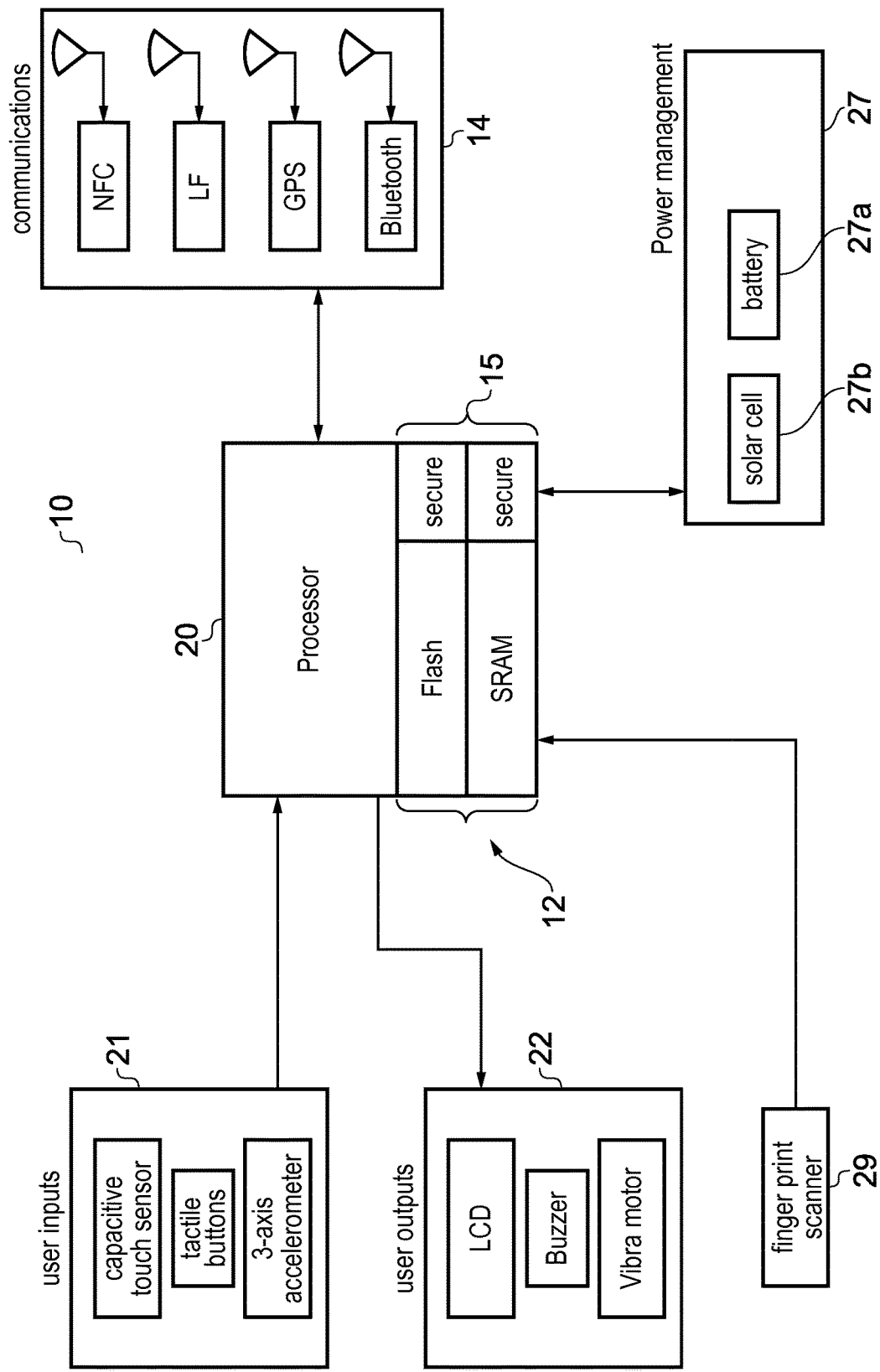
FIG. 7 shows the circuitry inside an envoy device according to an embodiment of the present invention.

FIG. 7 shows envoy device 10 in more detail with communication circuitry 14 having various communication capabilities, data store 12 having a secure portion 13 for storing authentication keys and other secure data and a non-secure portion 15, a central processor 20, user inputs 21 and user outputs 22 which are in the forms of buzzers, a vibra motor and an LCD display. There is also power management circuitry 27 for determining the capacity of the battery 27a and for selecting things such as a particular communication link in dependence upon the current power usage and requirements. There is also a solar cell 27b for recharging the lithium-ion battery 27a.

In this case there is also finger print scanner 29 for securely identifying the user.

Figure 8:
FIG. 8 shows some example codas that are displayed following completion of a transaction according to an embodiment of the present invention.

FIG. 8 shows an example of a coda which is displayed following a transaction, in this case the user has just received a car key from a car rental company. This is the screen shown after the initial iconographic display, which is displayed after the user has scrolled down or interacted in some way with the device. These are related to the transaction that has just completed and represent transactions that it is predicted a user may wish to select next, such that this selection is made easier. A list of previously displayed codas is also available to the user via a few user inputs.

In this example, the previous transaction that has just completed is shown at the top and then there a list of items displayed that are associated with the previous transaction and that it is predicted that a user may wish to use next. Thus, there is a "see details" options which allows one to see details of the car, a "share key" options which allows one to provide the key to someone else, a co-driver perhaps and a "see all keys" which allows one to access all keys that are currently available via the device.

The items shown are those associated with the previous transaction and that it is likely that user may wish to select next. This list of items may be updated using a learning process such that if following a particular transaction a user is found to often perform a certain other transaction that is not currently on the list, then this may be added to the list in place of an item that is not usually selected. Alternatively the list may be statically generated and the device may always show the same list of items associated with the completed transaction and that it is predicted that a user may select next.

Figure 9:
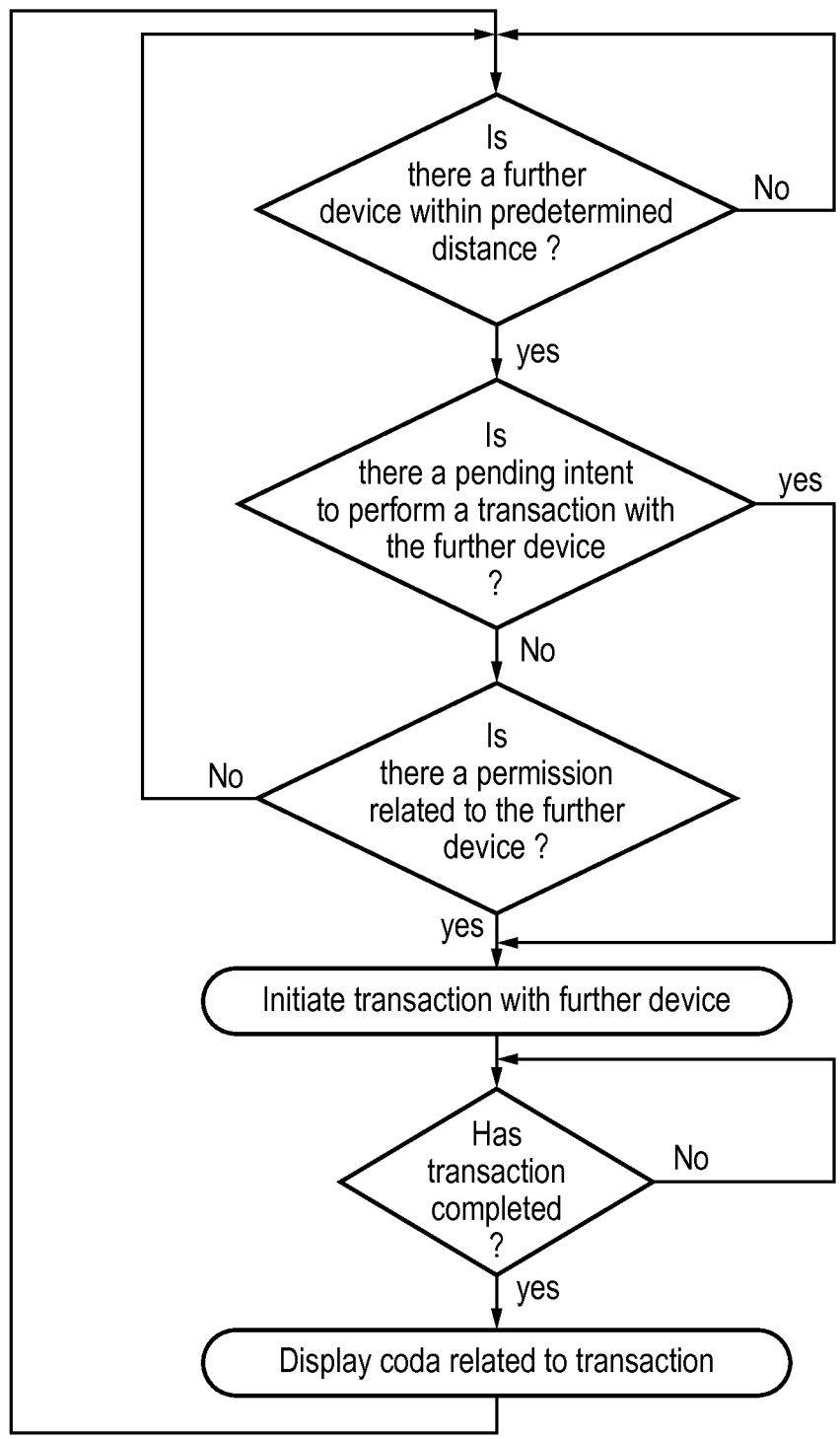
FIG. 9 shows a flow diagram illustrating steps in a method according to one technique.

FIG. 9 shows a flow diagram illustrating steps in a method for initiating a transaction with a local further device. Thus initially the envoy device determines whether there is a further device within a predetermined distance. It may do this by determining whether a further device is plugged into it or determining when it is in near field communication with a further device or determining when a user wearing the envoy device has touched the further device. In some cases there may be an additional step performed at this point of detecting whether the envoy device has performed a predetermined pattern of movement when within the predetermined distance.

If it determines that the device is within the predetermined distance (and if required that the predetermined pattern of motion has been detected), it is then determined if there is a pending intent to perform a transaction with the further device. If there is then that transaction is initiated. If there isn't then it is determined if there is a pending permission related to the further device. If there isn't then no transaction is initiated and the envoy device returns to determining again if there is a further device within the predetermined distance.

If there is a pending permission relating to the further device then a transaction is started with that further device that relates to this permission. When it is determined that the transaction has completed then a coda is displayed which relates to the transaction and is generally a transaction that it is predicted the user may wish to select next.

Figure 10:
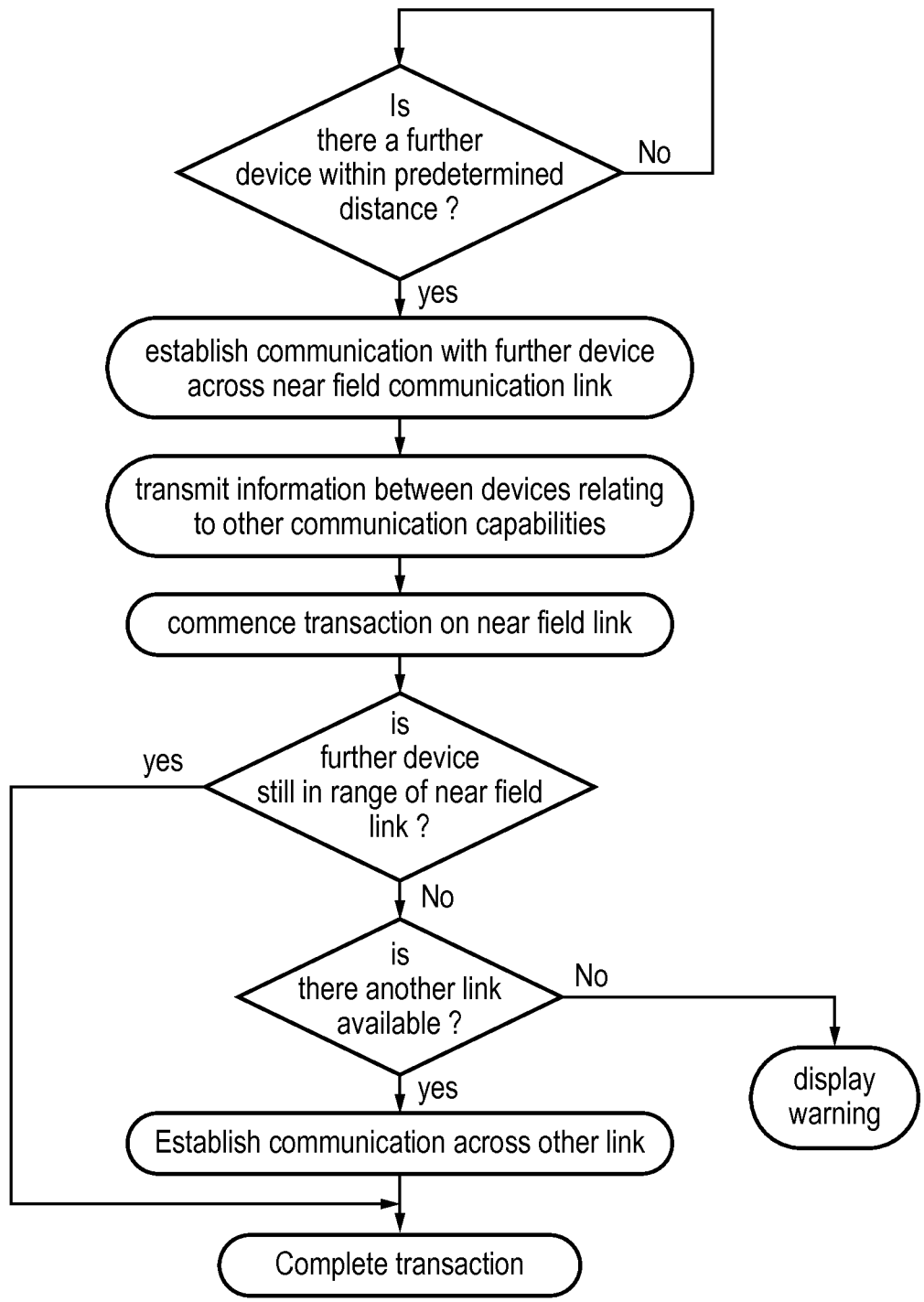
FIG. 10 shows steps in a method according to a further technique.

FIG. 10 shows a flow diagram illustrating steps in a method for establishing communication with a local further device. There is an initial step of detecting whether the further device is within a predetermined distance of the envoy device. If a further device is detected within this distance then communication with the further device is established using a local near field communication link. Information is then sent from the further device to the envoy device regarding any further communication links that the further device has access to and information is sent from the envoy device to the further device indicating information regarding any other communication links that the envoy device has access to. A transaction is then commenced with the further device using the near field communication link.

If the envoy device moves out of range of the near field link, then it is determined if there is another link available. If not a warning is displayed to the user indicating that he transaction cannot complete and the user should move back into range of the further device. If there is a further link then communication is established across this link using information transmitted between the devices using the near field link and the transaction is completed.

In some embodiments, rather than commencing the transaction with the further device using the local near field communication link a communication link is selected in dependence upon the information from a performance monitor which prioritises the links and a link is selected to commence the transaction with that has the highest priority of the available links. In this case generally the transaction is completed using this link unless the link becomes unavailable for some reason or the performance monitor determines that the current operating conditions of the device is such that this link no longer has a higher priority than other available links.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

We claim:

1. An envoy device configured to perform a transaction with a plurality of further devices, said envoy device comprising:
   a data store;
   a processor;
   communication circuitry for communicating with said plurality of further devices, one of said plurality of further devices being configured to permit access to a secured vehicle or a secured room; and
   a display;
   wherein the processor is configured to automatically initiate a transaction between said envoy device and said one of said plurality of further devices in response to detection of one of said plurality of further devices being within a predetermined physical proximity;
   wherein said transaction comprises use of a permission stored within said data store, said permission relating to said one of said plurality of further devices and comprising one or more of: keys to locks; passwords to computing devices; information data regarding a user of the envoy device;
   wherein, in response to said transaction completing, the processor is configured to display objects related to said transaction that it is determined said user may or may not wish to select to initiate a subsequent action on said envoy device; and
   wherein the processor is configured to use a learning process to identify which of the displayed objects the user selects in response to said transaction, and then in response to a further transaction completing, the processor is configured to use the learning process to predict an object related to said further transaction the processor has determined through the learning process that the user may wish to select and to display the predicted object on the display.

2. An envoy device according to claim 1, wherein said envoy device is configured to automatically initiate a transaction between said envoy device and said one of said plurality of further devices in response to detection of said one of said plurality of further devices being within a predetermined physical proximity and at least one further condition.

3. An envoy device according to claim 2, wherein said at least one further condition comprises a pending intent to perform a transaction with said one of said plurality of further devices.

4. An envoy device according to claim 1, wherein the processor is configured to display a plurality of related objects in response to a user operation.

5. An envoy device according to claim 1, wherein said envoy device is a portable device, and said display is configured to display fewer than 10 lines of text or 10 icons.

6. An envoy device according to claim 1, wherein the processor is configured to display said related object for a predetermined time after completion of said transaction and then to revert to one of a default display and a display that was displayed prior to said transaction being initiated.

7. An envoy device according to claim 1, wherein said envoy device is configured to be worn by said user.

8. An envoy device according to claim 7, wherein said envoy device is a watch and displays a time as said default display.

9. An envoy device according to claim 7, wherein said envoy device is configured to detect said predetermined physical proximity of said one of said plurality of further devices in response to said user touching said one of said plurality of further devices.

10. An envoy device according to claim 1, wherein said envoy device comprises a clock, the processor being configured to process permissions having a valid lifetime and to determine when said permissions with said valid lifetime have expired in dependence upon a value of said clock.

11. An envoy device according to claim 1, wherein said permission comprises at least one of a travel ticket, a key configured to provide access to a location, access to a thermostat, access to control of a power outlet and a representation of money.

12. An envoy device according to claim 1, wherein said permission comprises a key and said plurality of further devices comprises a lock, said displayed related object comprising a set of keys stored within said envoy device, said set of keys comprising said key and further keys related to said key and having different access permissions.

13. An envoy device according to claim 12, wherein at least one of said key and said further keys is a control key, said control key being configured to perform at least one of:
open said lock and to keep said lock open for a predetermined length of time, and
open and access diagnostic features in a car.

14. An envoy device according to claim 1, wherein the processor is configured to display a list of said most recently displayed related objects in response to a user selection.

15. An envoy device according to claim 1, wherein said communication circuitry comprises a near field communicator and said envoy device is configured to detect said predetermined physical proximity with said one of said plurality of further devices by establishing near field communication between said envoy device and said one of said plurality of further devices.

16. An envoy device according to claim 1, wherein said envoy device is configured to detect said predetermined physical proximity with said one of said plurality of further devices in response to bringing said envoy device within 5 cms of said one of said plurality of further devices.

17. An envoy device according to claim 1, wherein said envoy device is configured to detect said predetermined physical proximity with said one of said plurality of further devices in response to detecting said envoy device being moved in a predetermined pattern within a predetermined distance of said one of said plurality of further devices.

18. An envoy device according to claim 17, wherein said predetermined pattern comprises said envoy device moving towards and then away from said one of said plurality of further devices within a predetermined period of time.

19. An envoy device according to claim 17, wherein said predetermined pattern comprises said envoy device being moved to a particular orientation.

20. An envoy device according to claim 1, wherein said envoy device is configured to detect said predetermined physical proximity with said one of said plurality of further devices by being connected to said one of said plurality of further devices by a physical link.

21. A set of devices comprising said envoy device according to claim 1, and said plurality of further devices, said plurality of further devices comprising at least one device located or embedded in a user's environment.

22. A method of performing transactions between an envoy device and a plurality of further devices located physically close to each other, the method comprising the steps of:
detecting said envoy device and one of said plurality of further devices configured to permit access to a secured vehicle or a secured room within a predetermined physical proximity of each other;
automatically initiating a transaction between said envoy device and said one of said plurality of further devices in response to detecting said predetermined physical proximity;
wherein said transaction comprises use of a permission stored within said envoy device, said permission relating to said one of said plurality of further devices and comprising one or more of: keys to locks; passwords to computing devices; information data regarding a user of the envoy device;
in response to detecting said transaction completing:
displaying objects related to said transaction, that it is determined said user may or may not wish to select to initiate a subsequent action on said envoy device;
a processor in the envoy device using a learning process to identify which of the displayed objects the user selects in response to said transaction; and
in response to a further transaction completing, the processor using the learning process to predict an object related to said further transaction the processor has determined through the learning process that the user may wish to select and displaying the predicted object.

23. An envoy means for performing a transaction with a plurality of further means, said envoy means comprising:
a data storing means;
a processing means;
communication means for communicating with said plurality of further means, one of said plurality of further means being configured to permit access to a secured vehicle or a secured room; and
a displaying means;
said processing means being for automatically initiating a transaction between said envoy means and said one of said plurality of further means in response to detection of one of said plurality of further means being within a predetermined physical proximity;
wherein said transaction comprises use of a permission stored within said data storing means, said permission relating to said one of said plurality of further means and comprising one or more of: keys to locks; passwords to computing devices; information data regarding a user of the envoy device;
wherein, in response to said transaction completing, the processing means is configured to display objects related to said transaction that it is determined said user may or may not wish to select to initiate a subsequent action on said envoy means; and
wherein the processing means is configured to use a learning process to identify which of the displayed objects the user selects in response to said transaction, and then in response to a further transaction completing, the processing means is configured to use the learning process to predict an object related to said further transaction the processing means has determined through the learning process that the user may wish to select and to display the predicted object on the display.

* * * * *